United States Statutory Invention Registration [19]

Smith

[11] Reg. Number: H127

[45] Published: Sep. 2, 1986

[54] GUN TUBE, SCREW THREAD, SECTORING DEVICE

[75] Inventor: Thomas V. Smith, Troy, N.Y.

[73] Assignee: The United States of America as represented by the Secretary of the Army, Washington, D.C.

[21] Appl. No.: 769,052

[22] Filed: Aug. 26, 1985

[51] Int. Cl.[4] ..... B23D 5/02

[52] U.S. Cl. ..... 409/304; 409/329; 409/348

[58] Field of Search ..... 409/348, 304, 310, 327, 409/329, 339, 342, 343, 259, 268, 287; 10/120, 121; 408/148, 163

[56] References Cited

U.S. PATENT DOCUMENTS

| | | | |
|---|---|---|---|
| 865,188 | 9/1907 | Kunze | 409/304 |
| 1,459,240 | 6/1923 | Nonneman | 10/120 |
| 1,573,454 | 2/1926 | Shutz | 409/304 |
| 1,982,425 | 11/1934 | Glasson | 409/304 |
| 2,539,878 | 1/1951 | Walter | 409/348 |

*Primary Examiner*—Harold J. Tudor

*Attorney, Agent, or Firm*—Anthony T. Lane; Harold H. Card, Jr.; Michael C. Sachs

[57] ABSTRACT

The invention is an improved device for sectoring screw threads on gun tubes. The invention makes it possible to produce a plurality of sectors of screw threads on gun tubes instead of producing a single sector during each operation. The sectoring procedure is a machining process where portions of the screw thread are removed. The device for sectoring screw threads or gun tubes consists of a slide base assembly for positioning and holding other sub-assemblies of the device; a base plate with uprights for attaching to a machine tool bed or table; a clapper box head; and guide bars to provide for the exact positioning and longitudinal movement of the clapper box head.

6 Claims, 20 Drawing Figures

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

GUN TUBE, SCREW THREAD, SECTORING DEVICE

The invention described herein may be manufactured, used, and licensed by or for the Government for Governmental purposes without the payment to me or any royalties thereon.

BACKGROUND AND SUMMARY OF THE INVENTION

The invention relates to machining processes and in particular to a machining process for gun tubes. Specifically, it relates to a device for machining a plurality of sectors, simultaneously, on gun tube screw threads.

Gun tube, thread sectoring, is a machining process where portions of the threaded portion are removed, by either a milling or slotting operation. A horizontal shaper may be used as a power source or by other means of pushing and returning the sectoring device.

In the present invention there are methods of holding a gun tube, rotating it into the part of the shaping tool, and a means of attaching a sectoring device to the power source; the invention, however, is primarily concerned with machining multi-thread sectors simultaneously.

The gun tube, screw thread, sectoring device is a multi-cutter shaping head. When attached to a suitable power source, equipped with a means to rotate the gun tube, this invention will cut a plurality of opposing sectors simultaneously.

It is to be noted that with modifications a plurality of non-opposing sectors may also be cut. It is also to be noted that the present invention may be arranged to cut various conditions of opposing sectors simultaneously, but for clarity and simplification the description of the present invention is presented for cutting four opposing sectors simultaneously.

Furthermore, it is also to be understood that the device of the present invention may be fabricated in a plurality of sizes to meet the parameters of size, shape, and dimensions of various different gun tubes. However, it is also to be understood that within certain parameters the gun tube, screw thread, sectoring device of this invention may be of universal configuration to handle and machine more than one size of gun tube.

In the prior art the sectoring of gun tube screw threads is performed by one of two methods. One method utilizes a form of milling cutter which removes the metal of one sector only. Thus, in a comparable job of four opposing sectors requires four set-ups; similarly, six opposing sectors requires six set-ups; in other words, in the prior art only one sector can be produced at a time in a horizontal milling machine.

The other method utilizes a hydraulic shaper, pushing a cutting tool through the length of the thread. After each pass, the tube must be indexed to bring more metal into the path that the cutting or shaping tool will follow. This method also produces only one sector for each machining set-up. The shaper cutting tool cannot be the full sector width, and this requires the indexing of the tube prior to the push stroke of the shaper. It is an the push stroke of the shaper that the cutting tool removes metal in front of the tool.

Thus, the big problem in the prior art is that only one sector is produced at each set up, so that a plurality of set-ups is required for any given gun tube screw thread sectoring operation. The present invention eliminates that problem.

The actuator of the present invention may be a hydraulic shaper or a similar facility to produce the necessary motion, such as a large hydraulic cylinder. For purposes of simplicity, any description of the present invention will refer to the use of a hydraulic shaper when necessary to relate to the power source.

The present invention relates only to the sectoring device; facilities used to actuate the device, hold or index the gun tube, or the use of an adapter to connect the sectoring device to the actuator may be referred to, but are not part of the sectoring device of this invention.

It is to be noted that the present invention may also be utilized to cut keyways or slots in comparable arrangement.

It is, therefore, an object of this invention to provide a device to produce gun tube screw thread sectors.

It is also an object of this invention to provide a device that will cut a plurality of gun tube screw thread sectors simultaneously.

It is another object of this invention to provide a device for producing gun tube screw thread sectors that can be activated by various means.

It is still another object of this invention to provide a device that will cut a plurality of gun tube screw thread opposing sectors simultaneously.

Further objects and advantages of the invention will become more apparent in light of the following description of the preferred embodiments.

DESCRIPTION OF THE PREFERRED EMBODIMENTS

Figure 1:
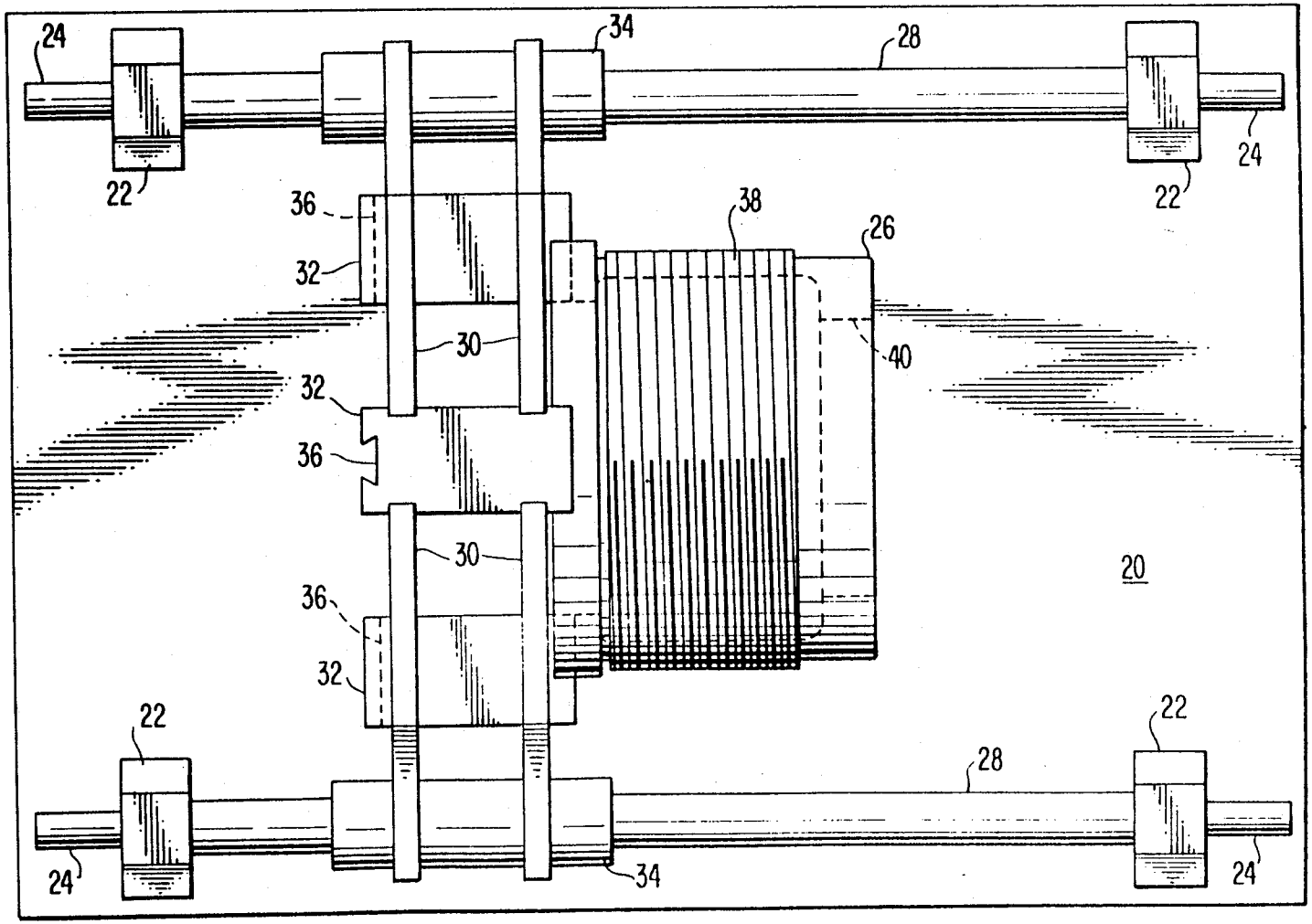
FIG. 1 is a plan view of a carrier fixture for a clapper box assembly for gun tube screw thread sectoring.

Referring now to the drawings, and particularly to FIGS. 2, 4, 5, and 18, a device for gun tube screw thread sectoring is shown at 10.

Figure 2:
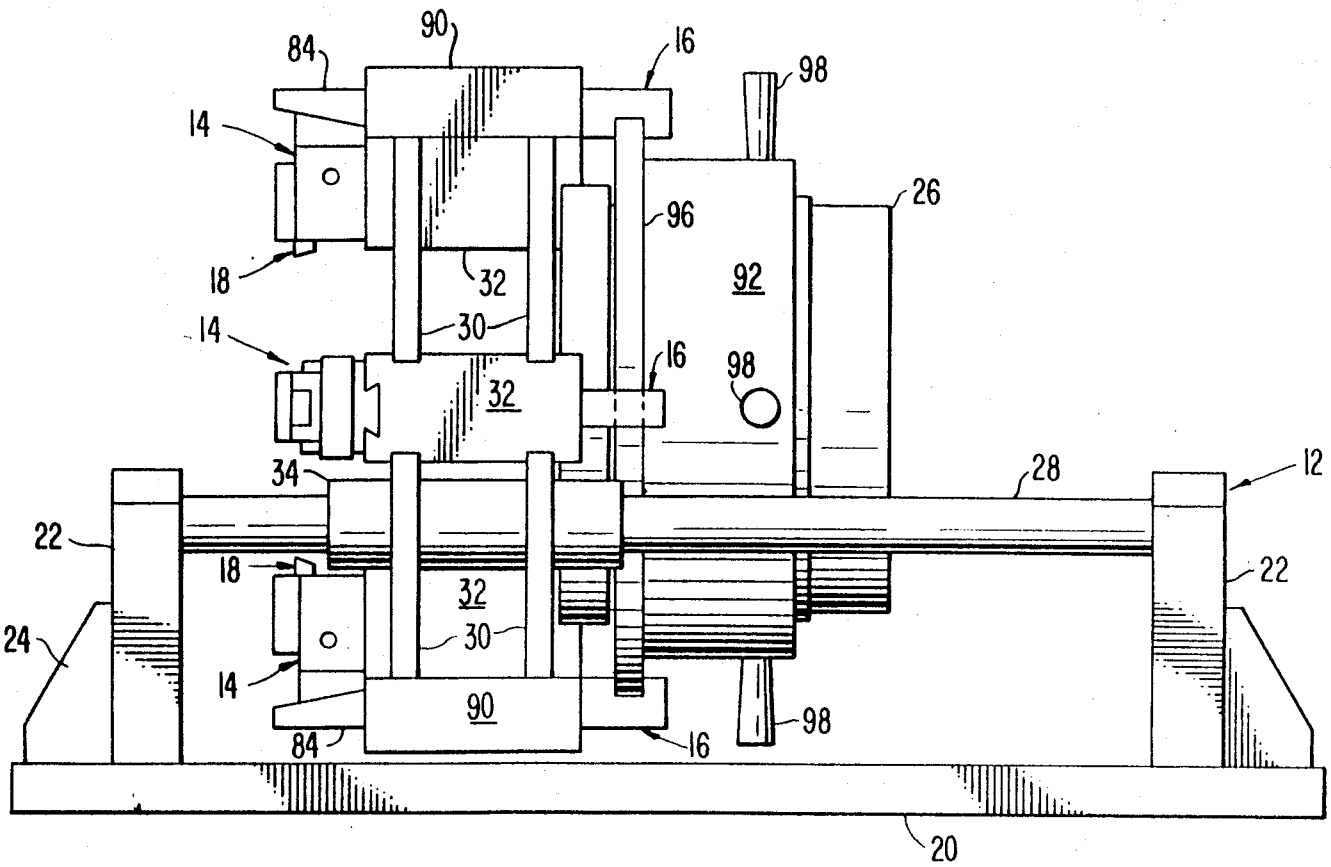
FIG. 2 is a side elevation of FIG. 1 assembled with a clapper box assembly for gun tube screw thread sectoring.
Figure 4:
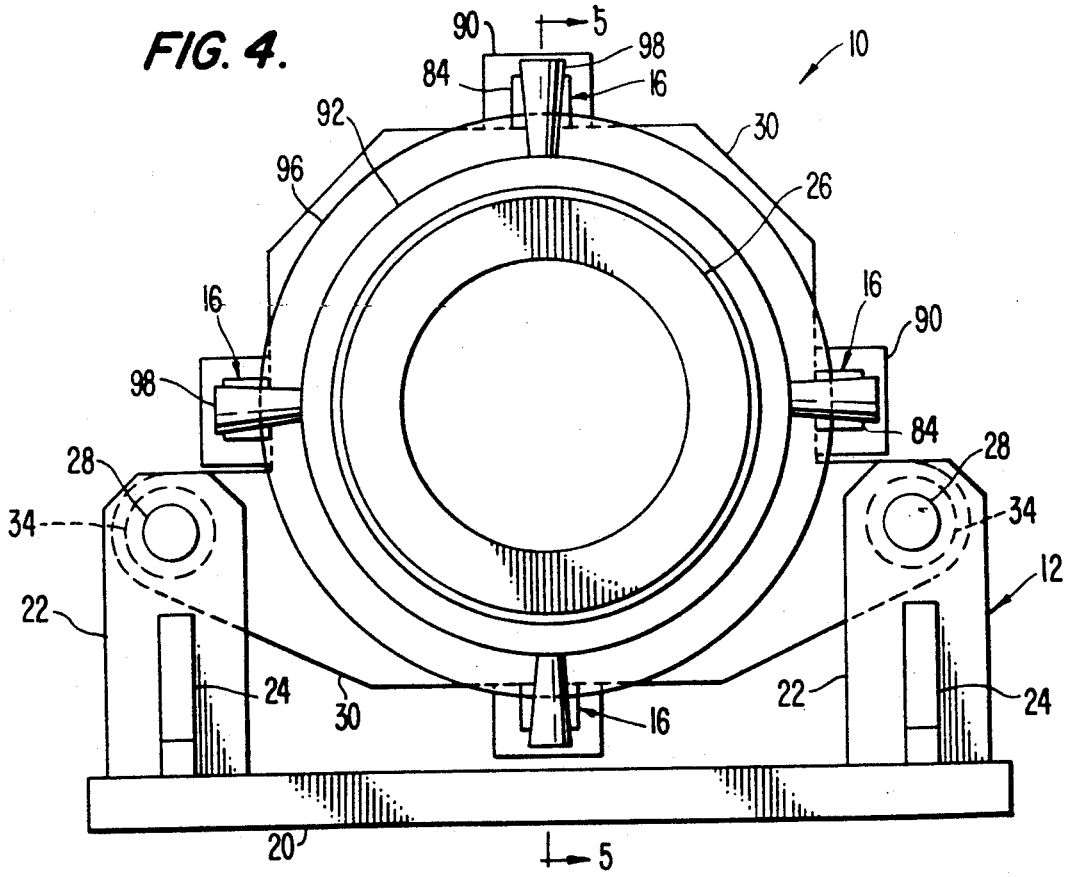
FIG. 4 is a right end view of FIG. 2.
Figure 5:
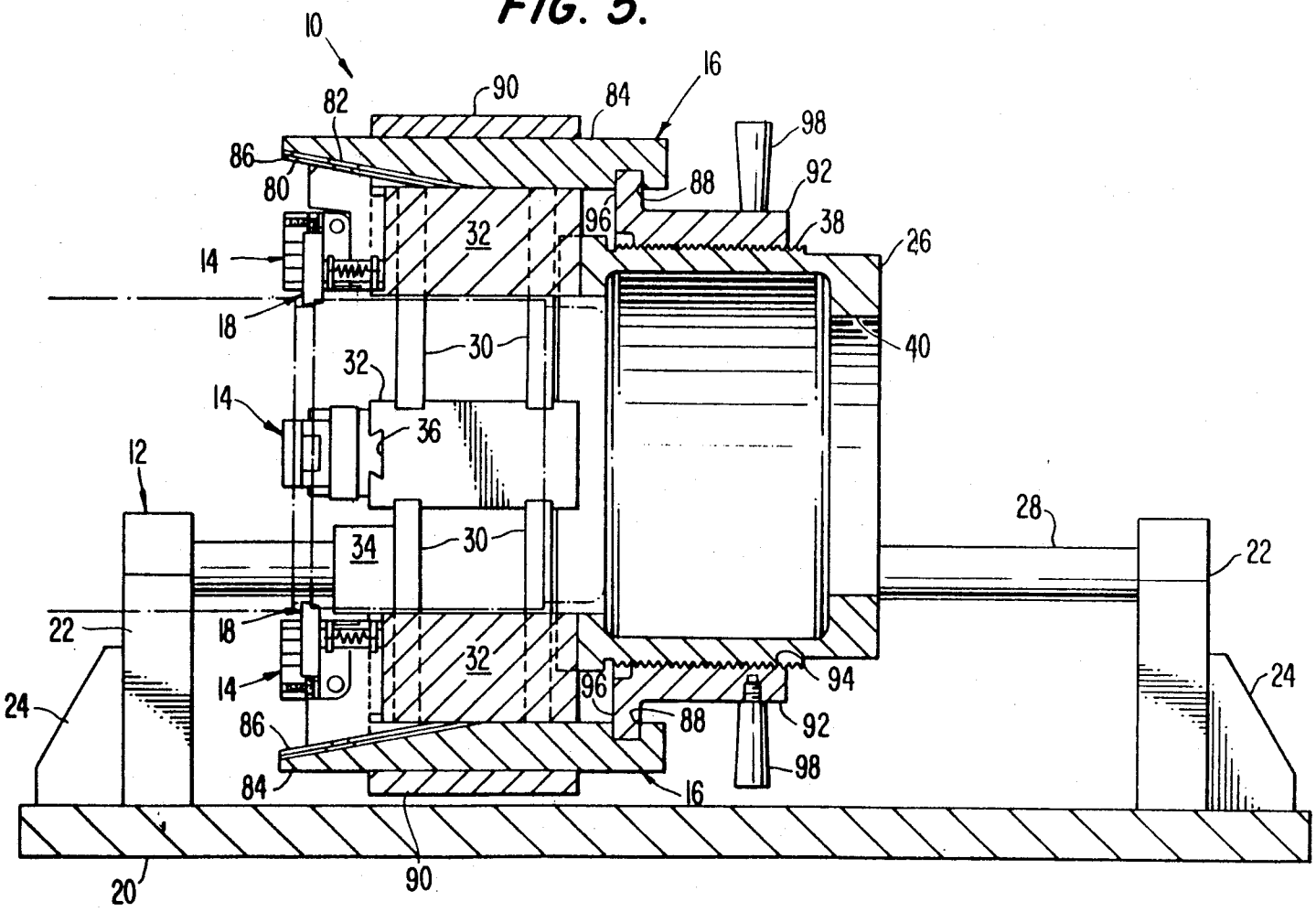
FIG. 5 is a longitudinal cross-sectional view of FIG. 2 taken on line 5—5 of FIG. 4.
Figure 6:
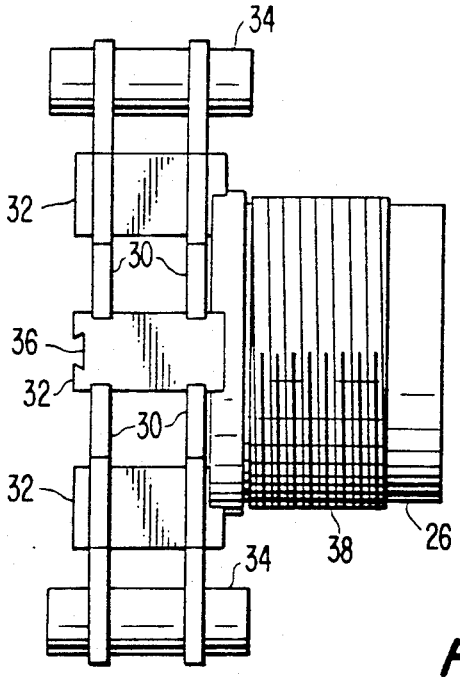
FIG. 6 is a plan view of a clapper box fixture head for gun tube screw thread sectoring.
Figure 7:
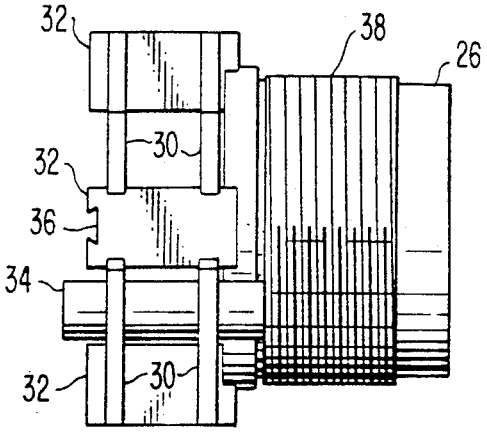
FIG. 7 is a side elevation of FIG. 6.
Figure 8:
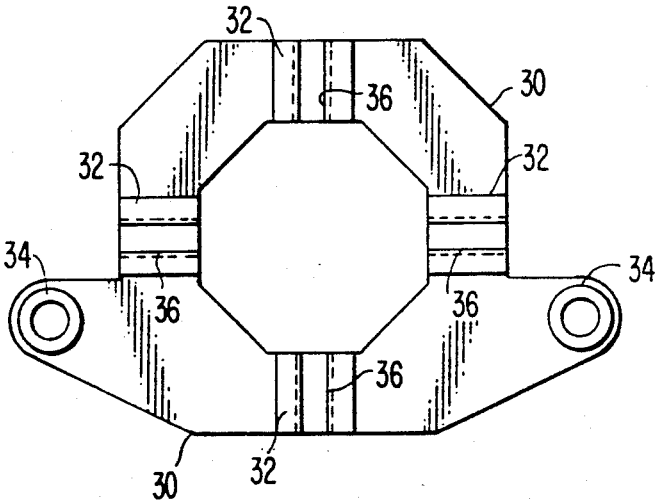
FIG. 8 is a left end view of FIG. 6.
Figure 9:
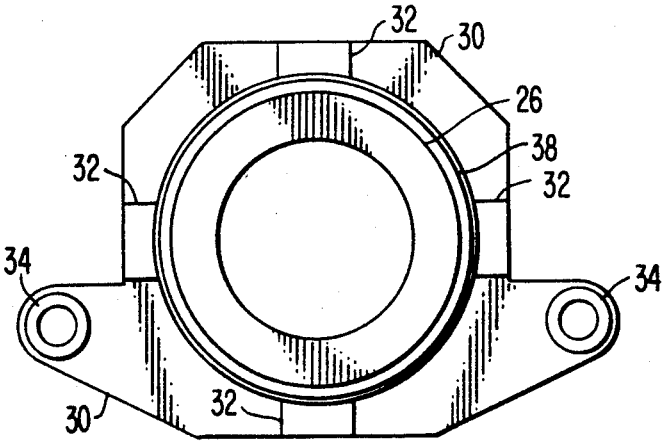
FIG. 9 is a right end view of FIG. 6.
Figure 18:
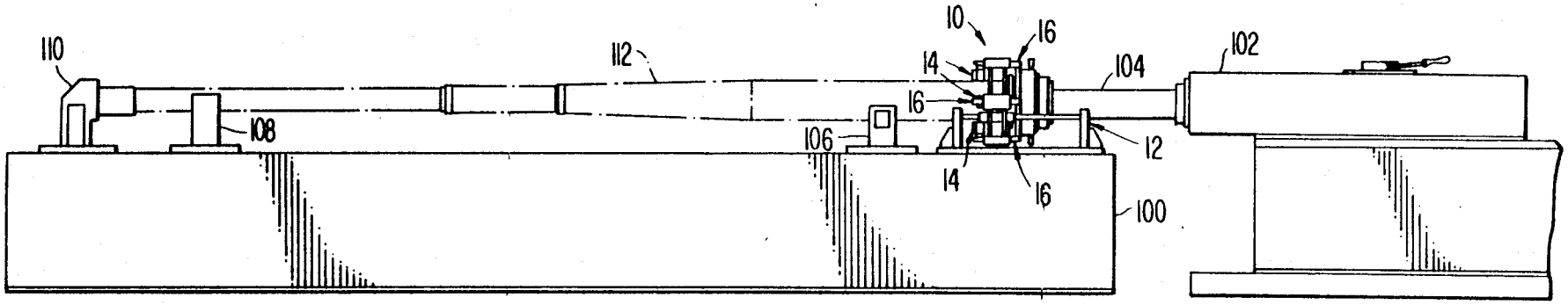
FIG. 18 is a side elevation of a typical set-up for gun tube screw thread sectoring.

FIG. 2 shows a device for gun tube screw thread sectoring 10 in side elevation, hereinafter referred to as a sectoring device 10; FIG. 4 shows a right end view of a sectoring device 10; FIG. 5 shows a sectoring device 10 in a longitudinal cross section; and FIG. 18 shows a sectoring device 10 in a set-up for operation. Details of these views and the components and elements of a sectoring device 10 are provided hereinafter.

The sectoring device 10 consists of four primary components: a carrier fixture component 12; a plurality of clapper box assemblies component 14; a plurality of motion transmitters component 16; and a plurality of cutting tools component 18. The elements of each of these four components will be described hereinafter as each component is discussed.

Note that three of the four components are in a plurality, though it is possible to use the sectoring device 10 with only one of each of the components. However, as sectors of a gun tube screw thread are normally provided in opposing pairs, the sectoring device 10 will normally use at least two of the components listed as a plurality. It is to be understood, however, that the invention may be arranged so as to have non-opposing sectors. For purposes of clarity, the drawings and descriptions herein are shown as using four of the components which are listed as a plurality.

Turning now to a description of the elements of the aforementioned four components, the components will be described in detail in the following order: carrier fixture component 12; clapper box assemblies component 14; motion transmitters component 16; and cutting tolls component 18.

Figure 3:
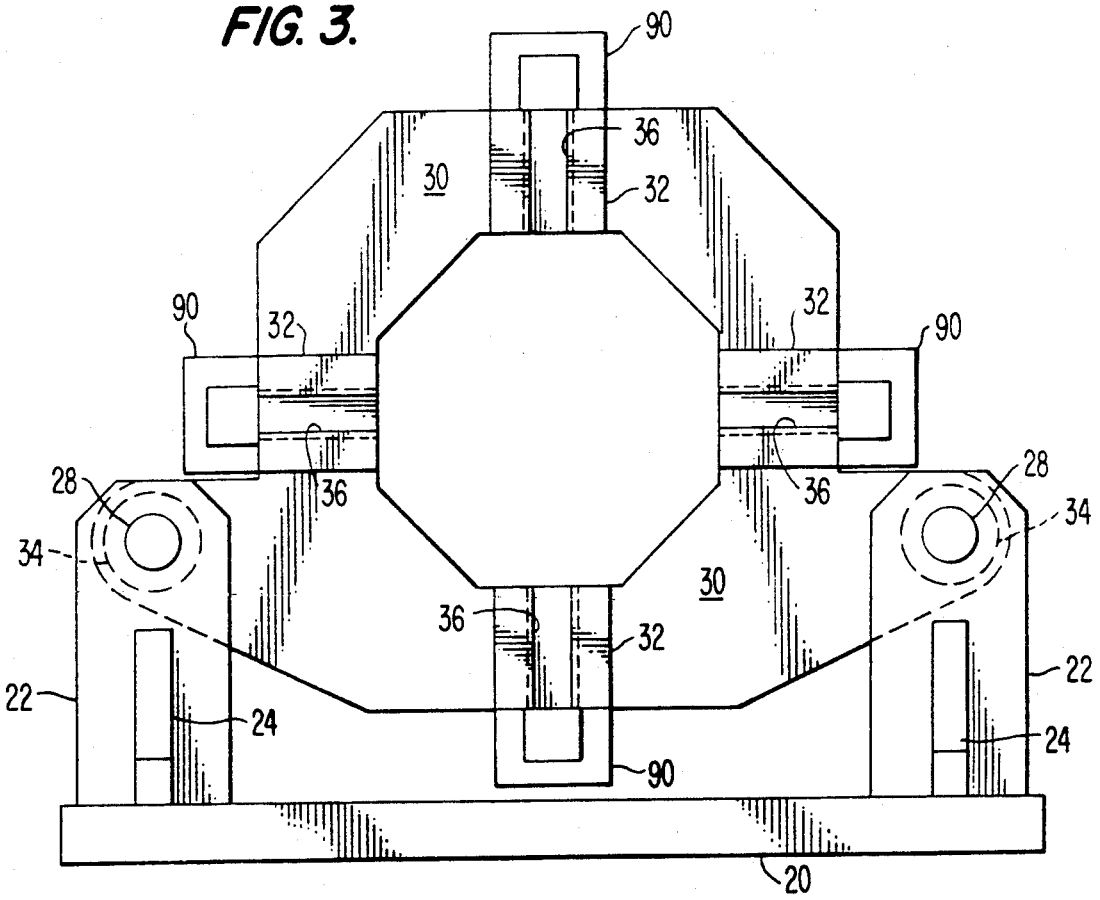
FIG. 3 is a left end view of FIG. 1.

The carrier fixture component 12 is shown in plan view in FIG. 1, in side elevation in FIG. 2, a left end view in FIG. 3, a right end view in FIG. 4 and as a cross-sectional view in FIG. 5.

The carrier fixture component 12 provides the means for positioning and holding the other components as will be described hereinafter, and as a means for mounting and affixing the sectoring device 10 to a holding structure 100 as shown in FIG. 18, and for supporting a means for connection to a power source 102 as also shown in FIG. 18. The relation to the holding structure 100 and the power source 102 is described hereinafter.

The carrier fixture component 12 consists of the following elements: a base plate 20; a plurality of slide guide supports 22; a plurality of reinforcement gussets 24; a feed screw body 26; a plurality of slide guides 28; a plurality of rib supports 30; a plurality of clapper box holders 32; and a plurality of slides 34. Details of each of the aforementioned elements of the carrier fixture component 12 and their cooperation with each other and the other components is described hereinafter.

The base plate 20 supports and positions the other components as hereinafter described, it also provides a means for affixing the sectoring device 10 to a holding structure 100, such as a machine tool bed or table.

The plurality of slide guide supports 22 are suitably affixed to the base plate 20, such as by welding, and suitably reinforced by the plurality of reinforcement gussets or ribs 24, such as by welding. It is to be understood that omission of the reinforcement gussets or ribs 24 is within the scope and intent of this invention. The plurality of slide guide supports 22 provide for the exact positioning and alignment of the plurality of the slide guides 28 which are suitably affixed to the plurality of slide guide supports 22, such as by journal-like ends on the plurality of slide guides 28 or by a press fit set into suitable aligned apertures in the plurality of slide guide supports 22.

When assembled as described hereinbefore, the plurality of slides 34, sliding on the aligned slide guides 28, provide for the exact positioning and longitudinal movement of the clapper box head which consists of a welded assembly of the other elements of the carrier fixture component 12 assembled and in cooperation with each other and the slides 34 as described hereinafter.

The clapper box head must move freely, fore and aft, with the slides 34, maintaining position and head alignment, while slipping and sliding freely on the slide guides 28.

The rib supports 30 connect the plurality of clapper box holders 32 to the plurality of slides 34 and to the feed screw body 26 by suitable means, such as by welding, to form the clapper box head in proper position and alignment. The plurality of clapper box holders 32 each have a machined groove 36, such as a dove-tail slot, to interface with a mating protrusion 70, such as a dove tail, on the clapper box assemblies component 14 described hereinafter.

The aforementioned clapper box head is a weldment consisting of certain elements of the carrier fixture component 12 is shown in FIGS. 6, 7, 8, and 9. The assembly of this weldment has been described hereinbefore.

The feed screw body 26 has an external screw thread 38 for cooperation with an internal screw thread 94 of feed nut 92 as described hereinafter. The feed screw body 26 also has an aperture 40 in the end to facilitate a suitable adapter means 104 to be fitted to the feed screw body 26 for suitably connecting the sectoring device 10 to a power source 102, such as a horizontal shaper, to serve as a linear actuator.

Turning now to the clapper box assemblies component 14, the elements are described hereinafter in conjunction with FIGS. 2, 5, 10, 11, 12, 13, 14, and 18. For simplification and clarification of the description of the plurality of clapper box assemblies component 14, note that four are shown in the drawings, but only one is described herein as each of the plurality of clapper box assemblies component 14 is exactly the same as each other.

FIG. 2 shows the clapper box assemblies component 14 in a side elevation of the sectoring device 10. FIG. 5 shows the clapper box assemblies component 14 in a cross-sectional elevation of the sectoring device 10. FIGS. 10, 11, 12, 13, and 14 show a bottom plan view, a left end view, a longitudinal cross-sectional view, a transverse cross-sectional view, and a projected plan view of a portion of a single clapper box assembly of the plurality of clapper box assemblies component 14. FIG. 18 shows the clapper box assemblies component 14 in operational position when assembled as part of the sectoring device 10.

Each single clapper box assembly of the plurality of clapper box assemblies component 14 consists of: a clapper box body 42; a clapper or pivot member 44; a clapper or pivot member cover 46; a pivot pin 48; a plurality of dowel pins 50; a first plurality of cap screws 52; a second plurality of cap screws 54; a first set screw 58; a second set screw 60; a plurality of spring posts 62; a tension spring 64; a chipguard 66; and a plurality of screws 68 for the chipguard 66. In fact, FIGS. 10, 11, 12, 13, and 14 show the entire details of a single clapper box assembly of the plurality of clapper box assemblies component 14.

Basically, the clapper box body 42 has the other elements of a single clapper box assembly (of the plurality of clapper box assemblies component 14) suitably affixed to it as hereinafter described. For simplicity and clarity in describing this single clapper box assembly it will be referred to hereinafter as clapper box 14'; but recognizing that it is only one of the plurality of clapper box assemblies component 14.

The clapper box body 42 has a machined pocket therein which is formed by the thrust stop surface 76 and the angular stop surface 78. These two stop surfaces, thrust stop surface 76, and angular stop surface 78, with their width forms the aforementioned machined pocket. Located within this machined pocket is the clapper or pivot member 44. The relationship of the clapper box body 42, the clapper or pivot member 44, the thrust stop surface 76, and the angular stop surface 78 can be seen best in the cross-sectional view FIG. 12. Note how the thrust stop surface 76 and the angular stop surface 78 forms the machined pocket in the clapper box 42 for the clapper or pivot member 44. Note, too, in FIG. 12 that the upper corner or edge is rounded to a suitable radius, and that a portion of the lower corner or edge is beveled.

The clapper or pivot member 44 is affixed in place by, and pivots on, pivot pin 48, which is set in a cylindrical bore in the clapper box body 42 and the pivot member 44. A clapper or pivot member cover 46 is located and positioned on the clapper or pivot member 44 by the plurality of dowel pins 50 and then affixed to the clapper or pivot member 44 by the plurality of first cap screws 52. The dowel pins 50 are a press fit in the clapper or pivot member 44 and a slide fit in the clapper or pivot member cover 46. Note that when the clapper or pivot member cover 46 is affixed to the clapper or pivot member 44, it forms the tool pocket 72. The tool pocket 72 can be seen best in FIG. 10. In the cross-sectional view FIG. 12 the cutting tool component 18 is shown in the tool pocket 72.

To position and affix the cutting tool component 18 in place: a first set screw 58 (adjustable) positions the cutting tool component 18 for its projection or protrusion from the tool pocket 72; a second set screw 60 locks or affixes the set screw 58 in place; and a plurality of second cap screws 54 in threaded holes 56 in the clapper or pivot member cover 46 locks or affixes the cutting tool component 18 in the tool pocket 72.

In operation, the clapper box 14' is pushed forward by the power source 102 to make a cut, the clapper or pivot member 44 bears against the thrust stop surface 76. On the return stroke the clapper or pivot member 44 pivots on the pivot pin 48, to the limit imposed by angular stop surface 78, to the limit imposed by angular stop surface 78, caused by the drag on the cutting tool component 18 on its angular face at the cutting edge.

When the clapper or pivot member 44 pivots as noted hereinbefore, it opens a space between the clapper or pivot member 44 and the thrust stop surface 76. To eliminate the pick-up of metal chips or debris in this open space, a chip guard 66 is fitted to the clapper box body 42 to cover the aforementioned open space. The chipguard 66 can be seen in FIGS. 10, 12, and 13. The chipguard 66 is suitably affixed to clapper box body 42 by the plurality of screws 68.

To maintain the seating of the clapper or pivot member 44 against the thrust stop surface 76, except when pivoting as aforementioned, a tension spring 64 is mounted or affixed to a plurality of spring posts 62. One of the plurality of spring posts is located within the clapper or pivot member 44 and the other spring post of the plurality of spring posts 62 is located within the clapper box body 42. The tension spring 64 is affixed to the spring posts 62 and is located and positioned within a cylindrical cavity 74 that extends through a portion of the clapper box body 42 and through the clapper or pivot member 44. The cylindrical cavity 74, the tension spring 64, and the plurality of spring posts 62 can be seen in relation to each other in FIG. 12. The cylindrical cavity can also be seen in FIG. 13.

Figure 10:
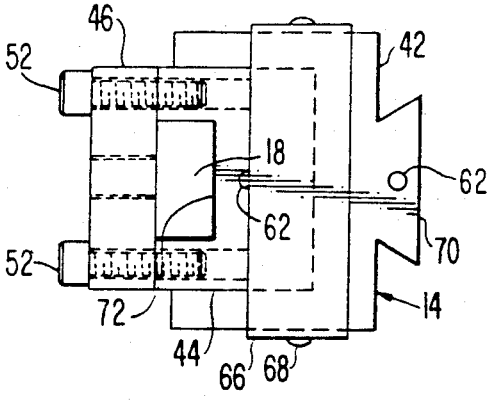
FIG. 10 is a bottom plan view of a clapper box assembly for gun tube screw thread sectoring.
Figure 11:
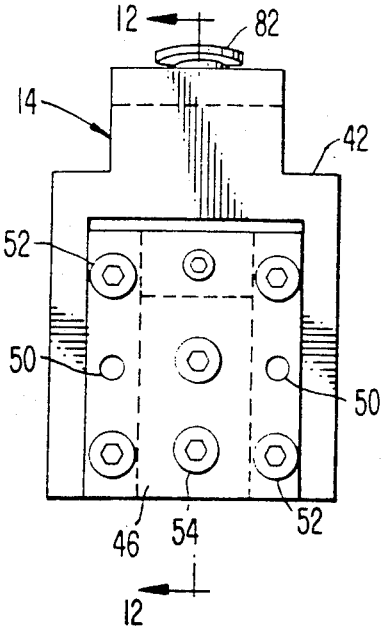
FIG. 11 is a left end view of FIG. 10.
Figure 12:
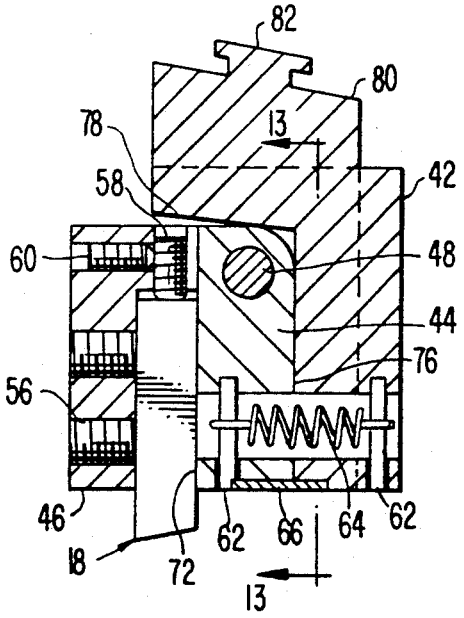
FIG. 12 is a longitudinal cross-sectional view of FIG. 10 on line 12—12 showing a cutting tool in place.
Figure 13:
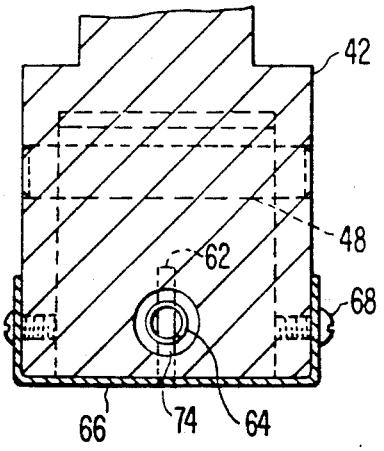
FIG. 13 is a partial transverse cross-sectional view of FIG. 10 on line 13–13.
Figure 14:
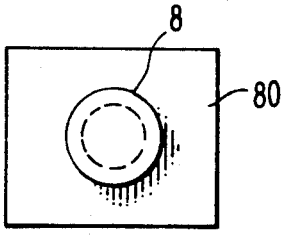
FIG. 14 is a projected plan view of a portion of FIG. 12.
Figure 15:
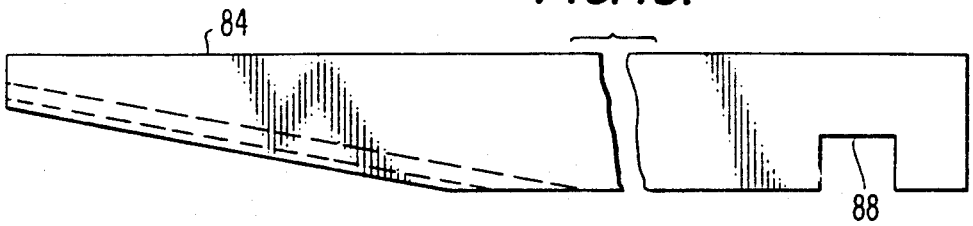
FIG. 15 is a side elevation of a clapper box feed finger for gun tube screw thread sectoring.
Figure 16:
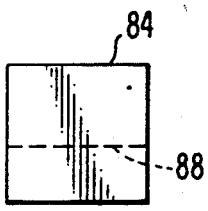
FIG. 16 is a right end view of FIG. 15.
Figure 17:
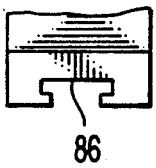
FIG. 17 is a partial projected left end view of FIG. 15.

The clapper box body 42 has a protruding dove-tail 70, which can be seen in FIG. 10. This dove-tail 70 matches, mates with, and interfaces with the dove-tail slot or machined groove 36 in the clapper box holder 32. This locks each clapper box assembly of the plurality of clapper box assemblies component 14 to the carrier fixture component 12 for operation.

The upper surface of each clapper box body 42 of each clapper box 14' is an angular surface 80 on which a button-like retract button 82 is located. The angular surface 80 and the retract button 82 can be seen in FIGS. 11, 12, 1n4 14. The angular surface 80 and the retract button 82 may be monolithic with the balance of the clapper box body 42, or may be fabricated separately and suitably affixed as by welding thereto. The monolithic arrangement is the preferred embodiment.

Turning now to the motion transmitters component 16, the elements of the component can be seen in FIGS. 2, 4, 5, 15, 16, 17, and 18.

The motion transmitters component 16 consists of a plurality of clapper box feed fingers 84, a plurality of feed finger guides 90 and a feed nut 92.

The motion transmitters component 16 provides the necessary movement, fore and aft, to either advance or retract the clapper box feed fingers 84, as hereinafter described, this fore and aft movement will drive the clapper box assemblies component 14 in the longitudinal direction or axis of the gun tube 112, thus positioning the cutting tool 18 for sectoring the gun tube screw threads.

The clapper box feed finger 84 has a "T" shaped slot 86 on the undermost side of the tapered end of the clapper box feed finger 84, and a rectangular shaped notch-like slot 88 near the opposite end on the undermost side of the untapered portion of the clapper box feed finger 84.

The feed nut 92 has an internal thread 94 on the interior thereof which interfaces and mates with the external screw thread 38 on the feed screw body 26. The feed nut 92 has an external projecting flange 96 on the innermost end of the feed nut 92. This external projecting flange 96 interfaces with the internal surfaces of the aforementioned rectangular shaped notch-like slot 99 in a sliding fit.

The feed nut 92 has a plurality of handles 98, spaced apart around the outermost end periphery of the feed nut 92, for manual operation of the feed nut 92.

The plurality of clapper box feed fingers 84 slidingly move in a plurality of feed finger guides 90 which are channel-like and suitably affixed to the clapper box holders 32 and rib supports 30 of the carrier fixture component 12.

In operation the power source 102, such as a horizontal shaper alternately pushes and pulls the adapter means 104 which is suitably affixed, as by threaded means, to feed screw body 26. This, in turn, transmits motion, fore and aft, to the feed nut 92 and the carrier fixture component 12 which concurrently transmits motion to the clapper box assemblies component 14, thereby causing the cutting tools component 18 to make a cut, on each forward stroke, in the sector areas being machined.

In order to set the cutting tools component 18 at the proper starting position the feed nut 92 is used to move the clapper box feed finger 84 to move the clapper box assemblies component 14 until cutting tools component 18, which consists of the plurality of cutting tools, are at the proper starting position. This movement is caused by the "T" slot 86 in each of the plurality of clapper box feed fingers 84 being interfaced with the plurality of retract buttons 82 on the angular surfaces 80 of each of the clapper box bodies 42. Thus, when the feed nut 92 is advanced or retracted, the projecting flange 96 of the feed unit 92, slidably moving in the notch-like slot 88 in each of the clapper box feed fingers 84, likewise advances or retracts the plurality of clapper box feed fingers 84 and through the interface of the "T" slot 86 with the retract buttons 82 and slidingly moving with the feed finger guides 90, moves the clapper box assemblies component 14 with the cutting tools component 18 therein to the desired position.

FIG. 18 shows a typical set up with a holding structure 100, such as a machine tool bed or table, on which is mounted the device for gun tube screw thread sectoring 10, a suitable first tube support 106, a suitable second tube support 108, and a suitable tube stop fixture 110. In the typical set up is a power source 102, such as a horizontal shaper, suitably connected by a suitable adapter means 104 between the power source 102 and the device for gun tube screw thread sectoring 10. A suitable indexing system may be used to move the typical gun tube 112 which rests in the first and second tube supports 106 and 108, respectively.

Figure 20:
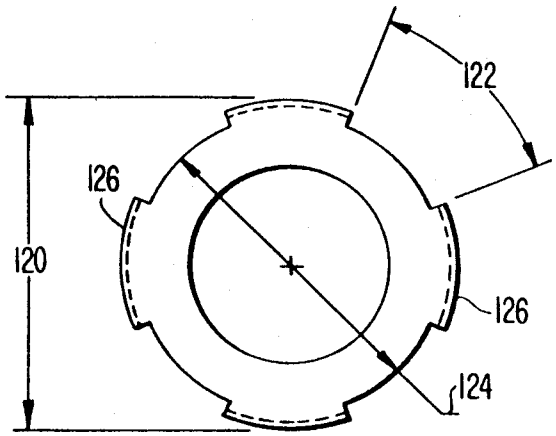
FIG. 20 is an end view of FIG. 19.
Figure 19:
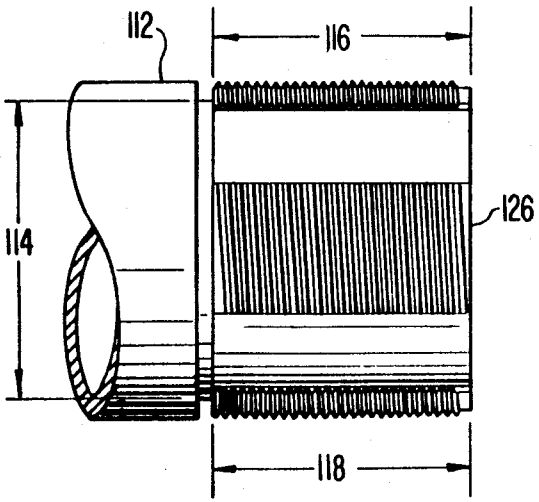
FIG. 19 is a side elevation of a portion of a gun tube showing screw threads sectored.

FIGS. 19 and 20 show the typical sectors as cut in a typical gun tube 112. Four typical opposing sectors are shown cut into the screw threads 126. The sector length 116 of the tube thread length 118, are shown in FIG. 19. In FIG. 20 the outside diameter 120 of the tube threads 126 is shown in comparison to the sector diameter 124 and the sector width 122.

Note that an undercut diameter 114 is provided to allow for the tool run out as the sector length 116 is cut.

As can be readily understood from the foregoing description of the invention, the present structure can be configured in different modes to provide the ability to cut sectors in the screw thread of a typical gun tube.

Accordingly, modifications and variations to which the invention is susceptible may be practiced without departing from the scope and intent of the appended claims.

What is claimed is:

1. A gun tube screw thread sectoring device, comprising:

a carrier fixture means;

a plurality of clapper box assembly means, each clapper box assembly means of said plurality of clapper box assembly means being spaced apart and suitable removably affixed to said carrier fixture means;

a plurality of motion transmission means, each motion transmission means of said plurality of motion transmission means being spaced apart and suitably affixed to said carrier fixture means and each said motion transmission means being suitably slidably and removably affixed to each said clapper box assembly means; and a plurality of cutting tool means, each cutting tool means being suitably and removably affixed to each said clapper box assembly means.

2. A gun tube screw thread sectoring device as recited in claim 1, wherein said carrier fixture means consists of a base plate means, a plurality of slide guide supports, a plurality of slide guides, a plurality of slide means, a feed screw body means, a plurality of rib support means, and a plurality of clapper box holding means, said plurality of slide guide supports being spaced apart and suitably affixed to said base plate means, said plurality of slide guides being spaced apart and suitably aligned with each other and suitably affixed to said spaced apart slide guide supports, each slide means of said plurality of slide means being slidably and removably assembled on a respective slide guide, said plurality of rib support means being suitably affixed to said plurality of slide means, said feed screw body means being suitably affixed to one of said plurality of rib support means, and each of said clapper box holding means being spaced apart and suitably affixed to said plurality of rib support means.

3. A gun tube screw thread sectoring device as recited in claim 2 and additionally, a plurality of reinforcement means, each of said plurality of reinforcement means being suitably affixed to a respective spaced apart slide guide support and to said base plate means.

4. A gun tube screw thread sectoring device as recited in claim 2, wherein each clapper box holding means of said plurality of clapper box holding means has a dove-tail configured slot in one external surface thereof, and said feed screw body means has an external screw thread thereon and an aperture in the outermost end thereof.

5. A gun tube screw thread sectoring device as recited in claim 4, wherein each clapper box assembly means of said plurality of clapper box assembly means consists of a clapper box body means, a clapper pivot member, a clapper pivot cover means, a pivot pin means, a plurality of dowel pins, a plurality of cap screws, a plurality of set screws, a plurality of spring posts, a tension spring, a chip guard means, and a plurality of screws, said plurality of cap screws comprising a first and second group of cap screws, said plurality of set screws comprising a first and second set screw, said clapper box body means having a machined pocket therein, said machined pocket having one machined surface thereof serving as a thrust stop surface and another machined surface thereof serving as an angular stop surface, said clapper box body means having a dove-tail configured protrusion on one external surface thereof, said clapper box body means having a cylindrical cavity therein and therethrough extending inwardly from one external surface thereof, said cylindrical cavity in said clapper box body means being extended to a motion cylindrical cavity in and through said clapper pivot member, said clapper box body means having another external surface thereof set at an angular relation to the other surfaces thereof, said external surface set at an angular relation to other surfaces having a button-like protrusion extending therefrom, said button-like protrusion serving as a retract button, said clapper pivot cover means and said clapper pivot member having a plurality of first threaded mating holes therein for said first group of said plurality of cap screws, said clapper box pivot cover means having a plurality of second threaded holes therein for said second group of said cap screws, said clapper pivot box cover means and said clapper pivot member having a plurality of mating holes therein for said plurality of dowel pins, said clapper box pivot cover means affixed to said clapper pivot member by said first group of cap screws being inserted into said first plurality of threaded holes, said affixing of clapper box pivot cover means to said clapper pivot member thereby forming a tool pocket for one of said plurality of cutting tool means, said plurality of dowel pins being inserted into said plurality of mating holes in said clapper pivot member by press fits, said dowel pins projecting from said clapper pivot member for slidable and removable passage into said mating holes in said clapper box pivot cover means by slip fits, said clapper pivot member being pivotably located and affixed within said machined pocket in said clapper box body means by said pivot pin means suitably assembled through aligned mating holes through said clapper box body means and said clapper pivot member, said first set screw being inserted in a threaded hole in said clapper box pivot cover for purposes of positioning one of said plurality of cutting tool means within said tool pocket, said second set screw being inserted in a threaded hole in said clapper box pivot cover at a right angle to said first set screw, said second set screw locking said first set screw in position, said second group of cap screws being assembled into said plurality of second threaded holes to affix and hold said one of said plurality of cutting tool means in said tool pocket when so assembled for use, one of said plurality of spring posts being suitably assembled in said clapper pivot member so as to pass through said mating cylindrical cavity therein, another of said plurality of spring posts being similarly suitably assembled in said clapper box body member so as to pass through said cylindrical cavity therein, said tension spring being assembled within said cylindrical cavity in said clapper box body means and said mating cylindrical cavity in said clapper pivot member by suitably affixing to said plurality of spring posts where said spring posts pass through said cylindrical cavity, said chipguard means being suitably assembled to said clapper box body means with said plurality of screws, said chipguard means being located externally across the juncture of said clapper pivot member with said clapper box body means at the interface thereof at said thrust stop surface, each said clapper box assembly means of said plurality of clapper box assembly means being suitably assembled to said clapper box holding means by slidably and removably assembling said dove-tailed configured protrusion on said clapper box body means into said dove-tailed configured slot in said clapper box holding means.

6. A gun tube screw thread sectoring device as recited in claim 5, wherein each motion transmission means of said plurality of motion transmission means consists of a clapper box feed finger means, a feed finger guide means, a feed nut means, and a plurality of handle means, said clapper box feed finger means being generally of rectangular transverse cross-section and having a portion of its longitudinal length tapered to a lesser rectangular transverse cross-section, the tapered surface of said tapered portion of said longitudinal length having a "T" shaped slot therein extended from the end of said lesser rectangular transverse cross-section along the length of said tapered surface of said tapered portion, said generally rectangular transverse cross-section opposite to said tapered portion having a rectangular notch spaced from the end, said notch opening on the surface adjacent to said tapered surface, said feed finger guide means being suitably assembled to said clapper box holding means and said rib support means, said feed finger guide means being generally channel shaped in configuration and when assembled to said clapper box holding means and said rib supports thereby forming a rectangular passageway therethrough, said feed nut means having an internal thread therein, said internal thread in said feed nut means matching and mating with external screw threads on said feed screw body means, said feed nut means being assembled to said feed screw body means by the mating of said internal screw threads of said feed nut means with said external screw threads of said feed screw body, said feed nut means having a rectangularly configured flange on one side thereof, said plurality of handle means being spaced apart and suitably affixed to the external surface of said feed nut means, said clapper box feed finger means being assembled to said feed nut means and said clapper box body means by inserting said clapper box feed finger means through said passageway formed by said feed finger guide means and having said "T" shaped configured slot in said clapper box feed finger means engage said retract button of said clapper box body means and retain said retract button within said "T" shaped configured slot, and concurrently having said rectangularly configured flange of said feed nut means slidably engaged within said rectangular notch in said clapper box feed finger means.

* * * * *